United States Patent [19]

Burgdorf et al.

[11] 4,321,984
[45] Mar. 30, 1982

[54] FLOATING-CALIPER SPOT-TYPE DISC BRAKE

[75] Inventors: Jochen Burgdorf, Offenbach-Rumpenheim; Karl Störzel, Sprendlingen, both of Fed. Rep. of Germany

[73] Assignee: ITT Industries, Inc., New York, N.Y.

[21] Appl. No.: 114,487

[22] Filed: Jan. 23, 1980

[30] Foreign Application Priority Data

Feb. 26, 1979 [DE] Fed. Rep. of Germany ....... 2907516

[51] Int. Cl.³ .............................................. F16D 55/18
[52] U.S. Cl. ............................... 188/73.39; 188/73.43
[58] Field of Search .................... 188/73.3, 73.4, 73.5, 188/73.6

[56] References Cited

U.S. PATENT DOCUMENTS

| | | | |
|---|---|---|---|
| 3,768,605 | 10/1973 | Carre | 188/73.5 |
| 3,773,150 | 11/1973 | Heibel | 188/73.5 |
| 3,841,446 | 10/1974 | Gravel | 188/73.3 |
| 3,954,158 | 5/1976 | Rist | 188/73.3 |
| 3,972,393 | 8/1976 | Courbet | 188/73.3 |
| 4,034,858 | 7/1977 | Rath | 188/73.3 |
| 4,044,864 | 8/1977 | Karasudani | 188/73.3 |
| 4,046,234 | 9/1977 | Kurata | 188/73.3 |
| 4,072,215 | 2/1978 | Burgdorf | 188/73.4 |
| 4,136,761 | 1/1979 | Burgdorf | 188/73.5 |
| 4,180,148 | 12/1979 | Souma | 188/73.5 |
| 4,199,159 | 4/1980 | Evans | 188/73.3 |
| 4,225,017 | 9/1980 | Op den Camp | 188/73.3 |

*Primary Examiner*—Joseph F. Peters, Jr.
*Assistant Examiner*—John A. Carroll
*Attorney, Agent, or Firm*—John T. O'Halloran; Alfred C. Hill

[57] ABSTRACT

In a disc brake having a caliper axially moveably guided at two arms of a brake carrier and having a first brake shoe supported in the caliper on one side of a brake disc and a second brake shoe supported and guided by the arms of the brake carrier on the other side of the brake disc, an arrangement, such as or including a spring, is provided adjacent the second brake shoe between the caliper and the brake carrier to hold the caliper in contact with a radial abutment surface supporting the caliper in the main direction of rotation of the disc. By this arrangement even wear of the brake pads is improved.

5 Claims, 3 Drawing Figures

FLOATING-CALIPER SPOT-TYPE DISC BRAKE

BACKGROUND OF THE INVENTION

The present invention relates to a floating-caliper spot-type disc brake provided with a brake disc rotating in the main direction of rotation and with a non-rotating brake carrier which is fastened to a vehicle on one side of the brake disc. The brake carrier partially extends over the edge of the brake disc and guides a brake caliper in an axially displaceable manner between guiding surfaces parallel to the brake disc's axis and supports the caliper in the circumferential direction of the brake disc, the brake caliper having connection with brake shoes arranged on both sides of the brake disc by means of its legs which are parallel with the brake disc, a first brake shoe of brake shoes being guided and held in the brake carrier on the side of the brake disc where the brake carrier is fastened.

Such a floating-caliper spot-type disc brake has come to knowledge in the German Patent DE-OS 2,048,519. The brake carrier projects beyond the brake disc by means of two arms running parallel with the brake disc axis and having projections on both sides of the brake disc, the projections facing each other and their front faces forming the guiding surfaces. The projections engage guiding grooves of the brake caliper, the bottom surfaces of which run parallel with the brake disc axis. There is a little play between the guiding surfaces and the bottom surfaces of the grooves as a result of which the brake caliper is easily displaceable in the axial direction. The brake shoe arranged on the side of the brake disc where the brake carrier is fastened can be applied to the brake disc by means of an actuating piston arranged in the adjacent leg of the brake caliper. The other brake shoe is positively fixed in the other leg of the brake caliper and is applied to the brake disc by the reaction force of the actuating piston which acts on the brake caliper.

When braking the rotating brake disc, at first the piston-side brake shoe, which is supported in the brake carrier, will abut the brake disc and will directly transmit all the ensuing frictional forces to the brake carrier. It is only then that the brake shoe, which is fixed in the leg of the brake caliper, will abut the brake disc, the ensuing frictional forces trying to displace the brake caliper in the main direction of rotation of the brake disc until it is able to support itself against the provided guiding surfaces of the brake carrier. Since the brake caliper on the brake carrier side of the disc, however, is in non-positive connection with the brake carrier due to the piston which is in frictional engagement with the brake shoe supported in the brake carrier, an inclination of the brake caliper and, hence, an uneven wear of the brake shoes will ensue since the plays due to the guidance between the brake caliper and the brake carrier will be overcome. Upon the release of the disc brake, the brake caliper will not return into its initial position and, upon a further braking operation, the inclination will become more and more pronounced until, due to abutment, the brake caliper will be supported between the guiding surfaces which, in relation to the brake disc, are respectively leading and trailing. This abutment defines the maximum inclination and, hence, the maximum of uneven wear of the brake shoes. A further inclination will now only be defined by the bending of the arm of the brake carrier which projects over the brake disc and which serves as a brake caliper support.

SUMMARY OF THE INVENTION

It is an object of the present invention to reduce the inclination of the brake caliper in order to thus minimize the uneven wear of the brake shoes.

A feature of the present invention is the provision of a floating-caliper spot-type disc brake comprising a rotating brake disc having an axis of rotation; a non-rotating brake carrier fixed in position on one side of the disc, the carrier having a pair of arms extending over the edge of the disc, each of the pair of arms having guiding surfaces parallel to the axis; a brake caliper disposed relative to the carrier to be guided in an axially displaceable manner and supported in a circumferential direction of the disc by the guiding surfaces, the caliper having a pair of legs each disposed parallel to and on opposite sides of the disc, a first of the pair of legs being associated with a first of a pair of brake shoes disposed on the one side of the disc and a second of the pair of legs supporting and guiding a second of the pair of brake shoes disposed on the other side of the disc, the first of the pair of brake shoes being guided and supported by the carrier; and an arrangement to provide a force acting on the caliper adjacent the one side of the disc to press the caliper in the main direction of the rotation of the disc, without play against that one of the guiding surface which is trailing in relation to the disc.

This force will ensure that, in the rest position, the brake caliper will stay without play against its supporting surface, which is trailing in relation to the brake disc, that extisting plays will thus not be overcome and that the inclination caused thereby will be prevented.

The most simple embodiment is to choose the position of assembly of the floating-caliper spot-type disc brake such as to have the weight of the brake caliper generate the force that will keep the brake caliper at its supporting surface which is trailing in relation to the brake disc. The structural shape of a floating caliper ensures that the center of gravity of the brake caliper will be on the side where the brake carrier is fastened. Thus, the weight of the caliper forces the brake caliper against the supporting surfaces which are trailing in relation to the brake disc.

If the above force is provided by a spring preloaded in the circumferential direction of the brake disc and acts between the brake carrier and the brake caliper higher forces will be made possible that will act on the brake caliper.

Thanks to the choice of a spring, the characteristic curve of which is preferably a progressive one, any inclination of the brake caliper may be counteracted by increasing forces.

An especially advantageous embodiment is that, in the circumferential direction of the brake disc, the brake carrier arm which is leading in relation to the brake disc has a guiding surface which features a mainly tangential arrangement with respect to the brake disc, and that the brake carrier arm which is trailing in relation to the brake disc has a guiding/supporting surface which features a mainly radial arrangement with respect to the brake disc. The leading guiding surfaces and the trailing guiding/supporting surfaces engage the brake caliper and the brake caliper is pressed against these surfaces by resilient means. The force which presses the brake caliper against the inclined leading guiding surface generates a second force in the main direction of rotation of the brake disc which second force will, hence, press the brake caliper against the guiding/supporting surface which is trailing in relation to the brake disc.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
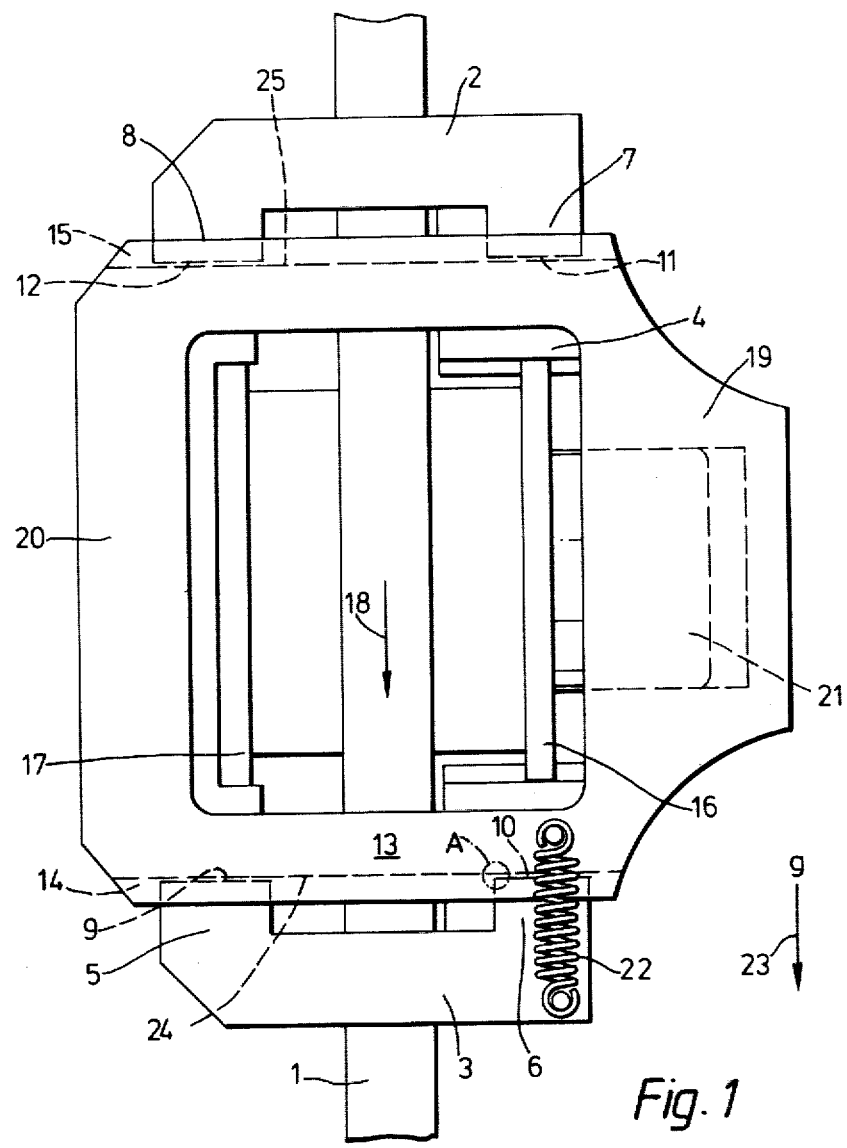
FIG. 1 is a top view of a first embodiment of a floating-caliper spot-type disc brake in accordance with the principles of the present invention.

In FIG. 1, the reference numeral 1 identifies the brake disc, the brake carrier is identified by the reference numeral 4 and the brake caliper is identified by the reference numeral 13. Brake carrier 4 embraces brake disc 1 by means of its two arms 2 and 3. On both sides of brake disc 1, arms 3 and 2 are provided with projections 5, 6 and 7, 8, respectively, pointing in the direction of the brake center. The fr ont faces 9, 10, 11 and 12 of projections 5, 6, 7 and 8, respectively serve as guiding surfaces for brake caliper 13. Brake caliper 13 is provided with grooves 14 and 15 which are parallel with the brake disc axis and engaged by projections 5, 6, 7, 8 of brake carrier arms 2 and 3. The bottoms 24 and 25 of grooves 14 and 15, respectively, are parallel to guiding surfaces 9, 10, 11 and 12 and cooperate therewith to form braking-force-transmitting supporting surfaces. The leg 19 of brake caliper 13 lying on the side of brake disc 1 adjacent the fastening point of brake carrier 4 accommodates a hydraulic actuating piston 21 which acts on the brake shoe 16 directly supported in brake carrier 4. The brake shoe 17, which is applied to disc 1 by the reaction force of actuating piston 21 via brake caliper 13, is supported in the leg 20 of brake caliper 13. On the side of brake disc 1 adjacent the fastening point of brake carrier 4, a spring 22 is fastened above projection 6 of brake carrier arm 3, spring 22 acting between brake caliper 13 and brake carrier 4 and keeping brake caliper 13, in the main direction of rotation 18 of brake disc 1, in abutment against guiding surfaces 9 and 10 which are trailing in relation to brake disc 1.

The reference numeral 23 marks the direction of the acceleration due to gravity, thus defining the position of assembly of the brake caliper, i.e. in the direction of motion of the arrangement in front of the brake disc axis.

If brake disc 1, rotating in the main direction of rotation 18 is braked, via guiding or supporting surface 10 in brake carrier 4, the frictional forces present in brake shoe 16 will be transmitted directly to brake carrier 4. The frictional forces present at brake shoe 17 will try to carry along leg 20 of brake caliper 13 connected with brake shoe 17 in the main direction of rotation of brake disc 1. Spring 22, however, will keep leg 20 of brake caliper 13 without play in abutment against surface 9 which is trailing in relation to brake disc 1. Consequently, the frictional forces will be transmitted directly to brake carrier 4. The frictional forces transmitted into brake carrier arm 3 via guiding surface 9 will bend brake carrier arm 3. Consequently, leg 20 of brake caliper 13 is displaced in the main direction of rotation of brake disc 1. Thus, guiding surface 9 will be displaced in the circumferential direction of brake disc 1 with regard to guiding surface 10, as a result of which brake caliper 13 will be tilted around the inwardly lying edge A of guiding surface 10 and adopt an inclined position with respect to brake disc 1. In doing so, brake caliper 13 will try to partially lift off of guiding surface 10. This, however, will be counteracted by the force of spring 22. If spring 22 is advantageously chosen such as to have a progressive characteristic curve the inclined position of brake caliper 13 will be counteracted by an increasing force. This force or increase in force, respectively, prevents a more pronounced inclination of brake caliper 13 and will thus reduce the uneven wear of brake shoes 16 and 17. Thanks to the chosen position of assembly of the floating-caliper spot-type disc brake, the weight of brake caliper 13 will have a supporting effect on the force of spring 22.

Figure 2:
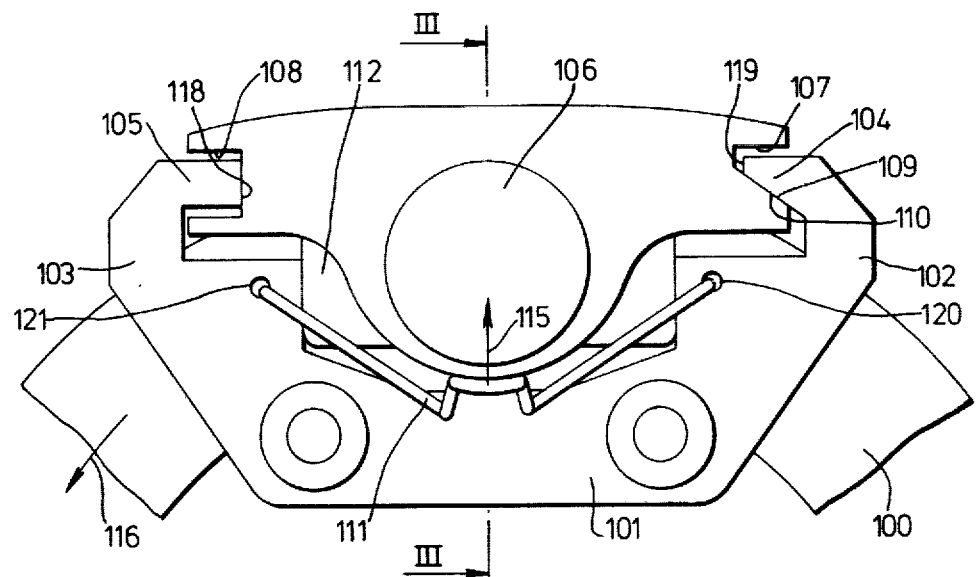
FIG. 2 is a side view of a second embodiment of a floating-caliper spot-type disc brake in accordance with the principles of the present invention, the illustrated side being the piston side of the floating-caliper spot-type disc brake.
Figure 3:
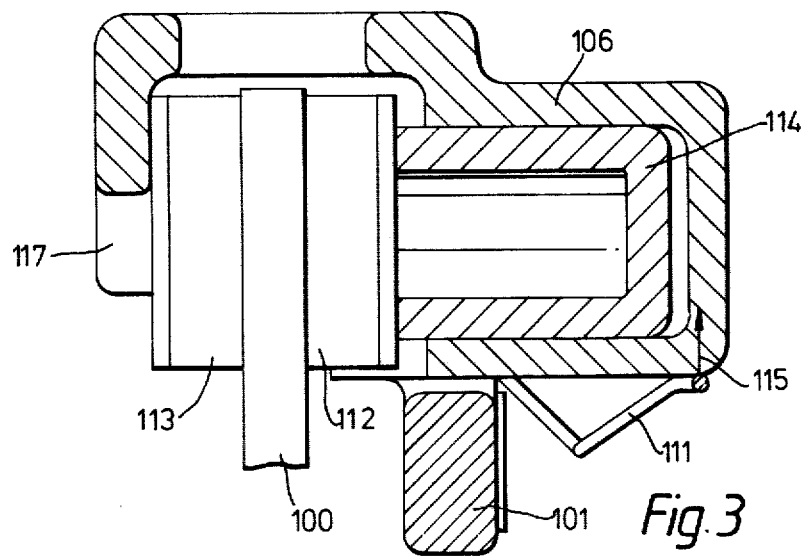
FIG. 3 is a cross sectional view taken along line III—III of FIG. 2.

FIGS. 2 and 3 illustrate another possible embodiment of the invention, which mainly differs from the embodiment of FIG. 1 with respect to the arrangement of the spring and with respect to the design of the guiding and supporting surfaces. The arms 102 and 103 of the brake carrier 101 embrace the brake disc 100. Arms 102 and 103 of brake carrier 101 have differently shaped projections 104 and 105 pointing towards each other and engaging grooves 107 and 108 of the brake caliper which are parallel to the brake disc axis. Projection 105 of the brake carrier arm 103, which is trailing in relation to brake disc 100 as seen in the main direction of rotation 116, only forms the axial guiding surface or, as seen in the circumferential direction of the brake disc, the brake caliper's supporting surface 118, respectively. Besides the supporting surface 119 which is parallel to supporting surface 118, arm 102, which is leading in relation to brake disc 100, has a guiding surface 109 which features a mainly tangential arrangement with regard to brake disc 100 and which is cooperating with the brake caliper via the contact surface 110. The brake caliper embraces brake disc 100 and has an actuating piston 114 in its leg 106 by means of which the brake shoe 112, directly supported in brake carrier 101, is applied to brake disc 100. The brake shoe 113 supported in the leg 117 of the brake caliper is applied to brake disc 100 by means of the reaction force acting on the brake caliper. Between brake carrier 101 and leg 106 of the brake caliper, a spring 111 is acting which is fixed in bores 120 and 121 and which exerts a radially outward pointing force 115 on the lower edge of leg 106. Thereby, the brake caliper will be pressed against guiding surface 109 via contact surface 110 and will be acted upon by a force in the circumferential direction of brake disc 100. The brake caliper will be kept without play in abutment against guiding surface 118 of brake carrier arm 103 which is trailing in relation to the brake disc. While, upon a braking operation, the brake caliper will try to lift off of guiding/supporting surface 118 on the side of brake disc 100 adjacent the fastening point of brake carrier 101, the force of spring 111 will be counteracting this effort as a result of which the inclination of the brake caliper and, thus, the uneven wear of brake shoes 112 and 113 will be kept within narrow limits.

While we have described above the principles of our invention in connection with specific apparatus it is to be clearly understood that this description is made only by way of example and not as a limitation to the scope of our invention as set forth in the objects thereof and in the accompanying claims.

We claim:

1. A floating-caliper spot-type disc brake comprising:
   a rotating brake disc having an axis of rotation and a main direction of rotation;
   a non-rotating brake carrier fixed in position on one side of said disc, said carrier having a pair of arms extending over the edge of said disc, each of said pair of arms having guiding surfaces parallel to said axis;
   a brake caliper disposed relative to said carrier to be guided in an axially displaceable manner and directly supported in a circumferential direction of said disc by said guiding surfaces, said caliper having a pair of legs each disposed parallel to and on opposite sides of said disc, a first of said pair of legs being associated with a first of a pair of brake shoes disposed on said one side of said disc and a second of said pair of legs circumferentially supporting and axially guiding a second of said pair of brake shoes disposed on the other side of said disc, said first of said pair of brake shoes being axially guided and circumferentially supported by said carrier; and
   an arrangement to provide a force acting on said caliper adjacent said one side of said disc to press said caliper, in said main direction of rotation of said disc, without play against that one of said guiding surfaces facing opposite to said main direction of rotation.

2. A brake according to claim 1, wherein
   said arrangement includes the assembly of said caliper relative to said carrier such that the weight of said caliper generates said force.

3. A brake according to claim 1, wherein
   said arrangement includes
   a spring preloaded in the circumferential direction of said disc connected between said caliper and said carrier.

4. A brake according to claim 3, wherein
   said spring has a progressive force characteristic.

5. A brake according to claim 1, wherein
   said arrangement includes
   the other of said guiding surfaces facing in the direction of said main direction of rotation having a tangential surface with respect to said disc,
   said one of said guiding surfaces having a radial surface with respect to said disc,
   said one and said other of said guiding surfaces engaging said first of said pair of legs, and
   resilient means engaging said carrier and said first of said pair of legs to press said first of said pair of legs against said one and said other of said guiding surfaces.

* * * * *